United States Patent
Du et al.

(10) Patent No.: US 12,003,304 B2
(45) Date of Patent: Jun. 4, 2024

(54) METHOD FOR DETERMINING BEAM SCANNING RANGE TERMINAL AND STORAGE MEDIUM

(71) Applicant: BEIJING XIAOMI MOBILE SOFTWARE CO., LTD., Beijing (CN)

(72) Inventors: Lei Du, Beijing (CN); Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 493 days.

(21) Appl. No.: 17/297,298

(22) PCT Filed: Nov. 29, 2018

(86) PCT No.: PCT/CN2018/118286
§ 371 (c)(1),
(2) Date: May 26, 2021

(87) PCT Pub. No.: WO2020/107347
PCT Pub. Date: Jun. 4, 2020

(65) Prior Publication Data
US 2021/0409092 A1 Dec. 30, 2021

(51) Int. Cl.
*H04B 7/06* (2006.01)
*H04B 7/08* (2006.01)
*H04W 72/542* (2023.01)

(52) U.S. Cl.
CPC ........... *H04B 7/0695* (2013.01); *H04B 7/086* (2013.01); *H04B 7/088* (2013.01); *H04W 72/542* (2023.01)

(58) Field of Classification Search
CPC ...... H04B 7/0695; H04B 7/086; H04B 7/088; H04W 72/542; H04W 72/046
See application file for complete search history.

(56) References Cited

U.S. PATENT DOCUMENTS

| | | | |
|---|---|---|---|
| 2015/0325912 A1 | 11/2015 | Liu | |
| 2017/0303262 A1 | 10/2017 | Yuan et al. | |
| 2018/0131434 A1* | 5/2018 | Islam | H04B 7/0408 |
| 2018/0132252 A1 | 5/2018 | Islam et al. | |
| 2019/0037530 A1* | 1/2019 | Han | H04W 16/28 |

FOREIGN PATENT DOCUMENTS

| | | |
|---|---|---|
| CN | 108155924 A | 6/2018 |
| WO | WO 2018155844 A1 | 8/2018 |

OTHER PUBLICATIONS

Indian Patent Application No. 202147028693, Office Action dated Mar. 10, 2022, 5 pages.
PCT/CN2018/118288 English translation of the International Search Report dated Sep. 2, 2019, 2 pages.
European Patent Application No. 18941199.4, Search and Opinion dated Jun. 15, 2022, 21 pages.

* cited by examiner

*Primary Examiner* — Rina C Pancholi
(74) *Attorney, Agent, or Firm* — COZEN O'CONNOR (57) ABSTRACT

A method for determining a beam scanning range includes acquiring status information of a terminal. The status information includes status data of at least one dimension and the at least one dimension is preset to affect the performance of a radio frequency device of the terminal. A preset rule is acquired. The preset rule includes a respective influence rule of each dimension on a beam scanning range. A beam scanning range is determined based on the status data of the at least one dimension and the preset rule.

16 Claims, 4 Drawing Sheets

--- acquiring status information of a terminal, the status information including status data of at least one dimension, and the at least one dimension being preset to affect performance of a radio frequency in the terminal ⟶ 201 acquiring a preset rule, the preset rule including a respective influence rule of each dimension on a beam scanning range ⟶ 202 determining a beam scanning range based on the status data of the at least one dimension and the preset rule ⟶ 203

METHOD FOR DETERMINING BEAM SCANNING RANGE TERMINAL AND STORAGE MEDIUM

CROSS-REFERENCE TO RELATED APPLICATION(S)

The present application is a 371 application of International Patent Application No. PCT/CN2018/118286, filed on Nov. 29, 2018, the disclosure of which is incorporated herein by reference in their entirety.

TECHNICAL FIELD

The disclosure relates to a field of communication technologies, and particularly to a method for determining a beam scanning range, a device for determining a beam scanning range, and a storage medium.

BACKGROUND

An existing communication system has been widely used due to its high speed and low delay. However, the existing communication system might produce great propagation loss. To make up for the propagation loss, a transmitting device usually transmits signals through beams to achieve directional communication with a receiving device. Before transmitting the signals through the beams, the transmitting device needs to perform beam scanning.

Taking the transmitting device as a terminal for description, a base station determines a beam scanning range based on all the beams in a spatial area and sends the beam scanning range to the terminal. The beam scanning range includes multiple beam identifiers to be scanned. The terminal scans and measures beams corresponding to the multiple beam identifiers within the beam scanning range to obtain a signal quality for each beam. Therefore, the terminal determines a beam to be used for signal transmission based on the signal quality of each beam and transmits signals to the base station through the determined beam.

SUMMARY

A method for determining a beam scanning range includes acquiring status information of a terminal, the status information including status data of at least one dimension, the at least one dimension being preset to affect performance of a radio frequency device in the terminal; acquiring a preset rule, the preset rule including a respective influence rule of each dimension on a beam scanning range; and determining a beam scanning range based on the status data of the at least one dimension and the preset rule.

A terminal includes a processor and a memory configured to store instructions executable by the processor. The processor is configured to acquire status information of a terminal, the status information including status data of at least one dimension, the at least one dimension being preset to affect performance of a radio frequency device in the terminal; acquire a preset rule, the preset rule including a respective influence rule of each dimension on a beam scanning range; and determine a beam scanning range based on the status data of the at least one dimension and the preset rule.

A non-transitory computer readable storage medium, having at least one instruction stored thereon. The at least one instruction is loaded by a processor to cause the processor to execute a method for determining a beam scanning range.

The method includes acquiring status information of a terminal, the status information including status data of at least one dimension, the at least one dimension being preset to affect performance of a radio frequency device in the terminal; acquiring a preset rule, the preset rule including a respective influence rule of each dimension on a beam scanning range; and determining a beam scanning range based on the status data of the at least one dimension and the preset rule.

BRIEF DESCRIPTION OF THE DRAWINGS

The drawings herein are incorporated into the specification and constitute a part of the specification, showing embodiments consistent with the disclosure, and used to explain the principle of the disclosure together with the specification.

DETAILED DESCRIPTION

In order to make the objectives, technical solutions, and advantages of the disclosure clear, the following further describes the disclosure in detail with reference to embodiments and drawings. Here, the exemplary embodiments of the disclosure and the description thereof are used to explain the disclosure, but not as a limitation to the disclosure.

In an example communications scenario, the base station determines a beam scanning range based on all the beams in a spatial area and sends the beam scanning range to the terminal. The beam scanning range includes multiple beam identifiers to be scanned. The terminal scans and measures beams corresponding to the multiple beam identifiers within the beam scanning range to obtain a signal quality for each beam. Therefore, the terminal determines a beam to be used for signal transmission based on the signal quality of each beam and transmits signals to the base station through the determined beam.

Therefore, the disclosure provides a method and a device for determining a beam scanning range, and a related storage medium. The disclosure will be described in detail below with reference to the accompanying drawings.

Figure 1:
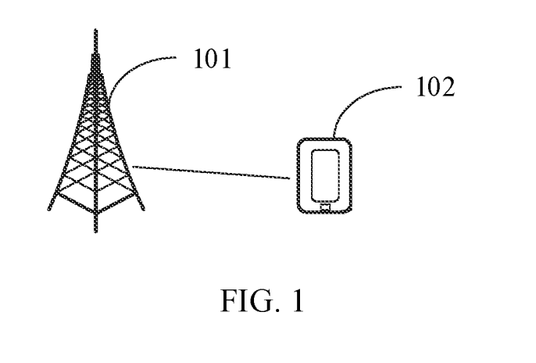
FIG. 1 is a schematic diagram illustrating a structure of a communication system according to some embodiments of the disclosure.

FIG. 1 is a schematic diagram illustrating a structure of a communication system according to some embodiments of the disclosure. As illustrated in FIG. 1, the communication system includes a base station 101 and a terminal 102. The base station 101 and the terminal 102 are connected through a communication network.

For a beam scanning process through the base station 101, the base station 101 determines the beam scanning range, performs beam scanning based on the beam scanning range to determine a transmission beam, and transmits a signal to the terminal 102 through the transmission beam. Moreover, the base station 101 also receives signals transmitted by the terminal 102 through a receiving beam.

For a beam scanning process through the terminal 102, as a possible implementation, the terminal 102 determines the beam scanning range based on status information, performs the beam scanning based on the beam scanning range to determine the transmission beam, and transmits signals to the base station 101 through the transmission beam. Moreover, the terminal 102 also receives signals transmitted by the base station 101 through the receiving beam.

Alternatively, in another possible implementation, the base station 101 can receive the status information of the terminal 102, determine the beam scanning range for the terminal 102 based on the status information of the terminal 102, and transmits the beam scanning range to the terminal 102. The terminal 102 can perform the beam scanning based on the beam scanning range.

Figure 2:
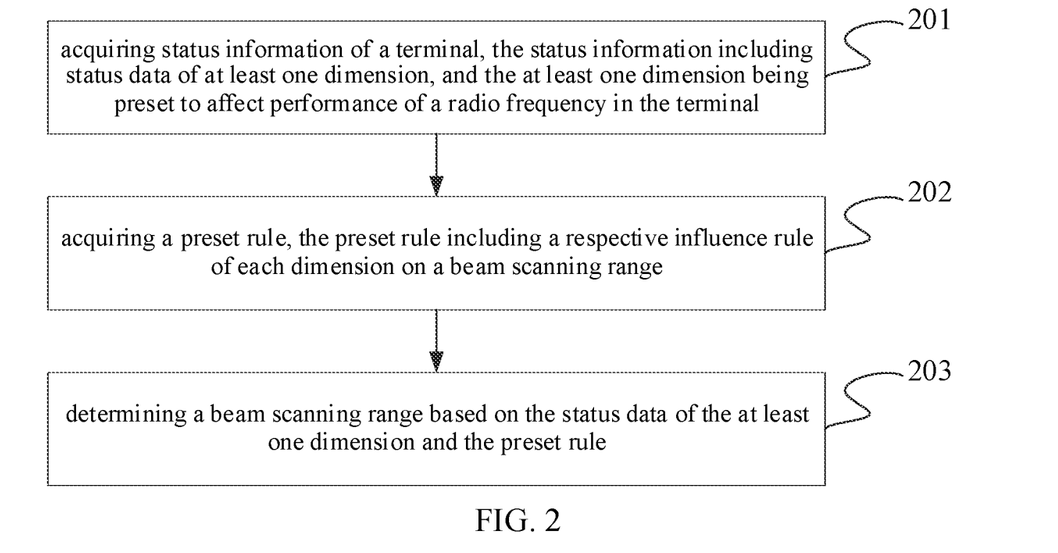
FIG. 2 is a flowchart illustrating a method for determining a beam scanning range according to some embodiments of the disclosure.

FIG. 2 is a flowchart illustrating a method for determining a beam scanning range according to some embodiments of the disclosure. The method is applied to the base station or the terminal illustrated in FIG. 1. As illustrated in FIG. 2, the method may include the following.

In step 201, status information of the terminal is acquired. The status information includes status data of at least one dimension. The at least one dimension is one or more preset dimensions that affect performance of a radio frequency device in the terminal.

In step 202, a preset rule is acquired. The preset rule includes an influence rule of each of the at least one dimension on a beam scanning range.

In step 203, the beam scanning range is determined based on the status data of the at least one dimension and the preset rule.

With the method for determining the beam scanning range according to some embodiments of the disclosure, the status information of the terminal and the preset rule are acquired. The status information includes the status data of the at least one dimension, and at least one dimension is preset one or more dimensions that affect the performance of the radio frequency device in the terminal. The preset rule includes the influence rule of each of the at least one dimension on the beam scanning range. The beam scanning range can be determined based on the status data of the at least one dimension and the preset rule. A beam that is greatly affected by the status of the terminal may be removed to narrow the beam scanning range, thereby saving scanning time, improving scanning efficiency, and reducing signal transmission delay.

In a possible implementation, the status information includes at least one of a first type of status information, a second type of status information, or a third type of status information.

The first type of status information is used to indicate a relative position relationship between the radio frequency device and other devices in the terminal or a change in a relative position relationship between the radio frequency device and other devices in the terminal.

The second type of status information is used to indicate a working status of the terminal or a change in a working status of the terminal.

The third type of status information is used to indicate a posture of the terminal or a change in a posture of the terminal.

In another possible implementation, the first type of status information includes at least one of an extended identifier of a camera, a folding angle of the terminal, or a change in a folding angle of the terminal. The extended identifier is used to indicate whether the camera is in an extended state or in a retracted state. The extended state means that the camera protrudes from the terminal. The retracted state means that the camera retracts into the terminal.

The second type of status information includes at least one of global status data of the terminal, a change in global status data of the terminal, status data of at least one device in the terminal, and a change in status data of at least one device in the terminal.

The third type of status information includes at least one of posture information of the terminal, a change in posture information of the terminal, or a folding identifier. The folding identifier is used to indicate whether the terminal is folded or unfolded.

In another possible implementation, the preset rule includes a first correspondence between status data of a first target dimension included in the at least one dimension and beam scanning ranges.

Determining the beam scanning range based on the status data of the at least one dimension and the preset rule includes determining the beam scanning range corresponding to the status data of the first target dimension based on the status data of the first target dimension and the first correspondence.

In another possible implementation, the preset rule includes a second correspondence between status data of a second target dimension included in the at least one dimension and adjustment manners of the beam scanning range.

Determining the beam scanning range based on the status data of the at least one dimension and the preset rule includes determining an adjustment manner of the beam scanning range corresponding to the status data of the second target dimension based on the status data of the second target dimension and the second correspondence; and obtaining an adjusted beam scanning range by adjusting an original beam scanning range based on the adjustment manner.

In another possible implementation, the preset rule includes a first correspondence between status data of a first target dimension included in the at least one dimension and beam scanning ranges, and a second correspondence between status data of a second target dimension included in the at least one dimension and adjustment manners of the beam scanning range.

Determining the beam scanning range based on the status data of the at least one dimension and the preset rule includes determining a first beam scanning range corresponding to the status data of the first target dimension based on the status data of the first target dimension and the first correspondence, determining an adjustment manner of the beam scanning range corresponding to the status data of the second target dimension based on the status data of the second target dimension and the second correspondence, and adjusting the first beam scanning range based on the adjustment manner to obtain the adjusted beam scanning range.

In another possible implementation, the preset rule includes weights of multiple dimensions and a third correspondence between index identifiers and the beam scanning ranges.

Determining the beam scanning range based on the status data of the at least one dimension and the preset rule includes obtaining an index identifier by performing a weighted summation based on the status data of the multiple dimensions of the at least one dimension and the weights of the multiple dimensions, and determining the beam scanning range corresponding to the index identifier obtained by the weighted summation based on the third correspondence.

In another possible implementation, the method further includes performing the beam scanning based on multiple beam identifiers within the beam scanning range. In another possible implementation, the method further includes determining a scanning step length based on the number of the beam identifiers within the beam scanning range, determining a beam identifier to be scanned from the beam scanning range based on the scanning step length, and performing the beam scanning based on the beam identifier to be scanned.

In another possible implementation, the method further includes transmitting the beam scanning range to the terminal, and performing by the terminal the beam scanning based on the multiple beam identifiers within the beam scanning range. In another possible implementation, the method further includes transmitting the beam scanning range to the terminal, determining by the terminal a scanning step length based on the number of the beam identifiers within the beam scanning range, determining a beam identifier to be scanned from the beam scanning range based on the scanning step length, and performing the beam scanning based on the beam identifier to be scanned.

Figure 3:
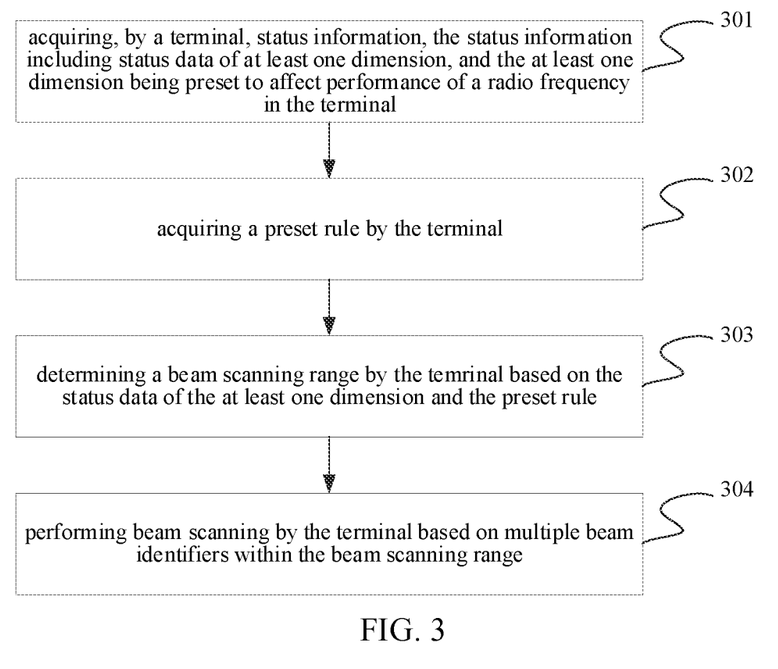
FIG. 3 is a flowchart illustrating a method for determining a beam scanning range according to some embodiments of the disclosure.

FIG. 3 is a flowchart illustrating a method for determining a beam scanning range according to some embodiments of the disclosure. The method is applied to the terminal illustrated in FIG. 1. As illustrated in FIG. 3, the method includes the following.

In step 301, the terminal obtains status information. The status information includes status data of at least one dimension. The at least one dimension is preset one or more dimensions that affect performance of a radio frequency device in the terminal.

The terminal may be a device having a communication function, such as a mobile phone, a computer, or a personal computer. The terminal is also equipped with the radio frequency device. The radio frequency device may be an antenna, an inductance device or other devices with the communication function.

The terminal can perform directional communication with a base station through the radio frequency device. In the process of directional communication, the terminal may perform beam scanning and beam measurement, determine a beam to be used, and transmit signals to the base station through the beam to be used.

The status of the terminal may affect the performance of the radio frequency device, and the performance of the radio frequency device may affect the signal transmission quality of beams. Therefore, in the disclosure, the beam scanning range can be determined based on the status information of the terminal, as well as a relationship between the status information of the terminal, the performance of the radio frequency device, and the signal transmission quality of the beam. The beam scanning can be performed based on the beam scanning range.

The status of the terminal can be described on multiple dimensions. That is, the status information of the terminal can include multiple-dimensional status data (status data of multiple dimensions). To determine the beam scanning range, at least one dimension that affects the performance of the radio frequency device in the terminal can be preset based on the multiple dimensions for describing the status of the terminal, and the status data of the at least one dimension can be obtained. The status data of a dimension is used to describe the status of the terminal on that dimension.

The status information includes at least one of a first type of status information, a second type of status information, or a third type of the status information.

1. The first type of status information is used to indicate a relative position relationship between the radio frequency device and other devices in the terminal than the radio frequency device or a change of a relative position relationship between the radio frequency device and other devices in the terminal.

In addition to the radio frequency device, the terminal is also equipped with other devices. These devices may block the radio frequency device, affect the performance of the radio frequency device, and then affect the signal transmission quality of the beam. Therefore, the first type of status information of the terminal can be obtained, and a shielding situation of the radio frequency device by other devices may be determined based on the relative position relationship or the change of the relative position relationship between other devices and the radio frequency device. In addition, the beam scanning range may be determined based on the shielding situation.

The first type of status information includes at least one of an extended identifier of a camera, a folding angle of the terminal, or a change in a folding angle of the terminal.

For example, the terminal is equipped with a retractable camera. When the camera is in an extended state, the camera may block the radio frequency device. When the camera is in a retracted state, the radio frequency device is not blocked. Therefore, the first type of status information can include an extended identifier of the camera. The extended identifier is used to indicate whether the camera is in the extended state or in the retracted state, such that the extended identifier may equal to 0 or 1. When the extended identifier equals to 0, the camera is in the retracted state. When the extended identifier equal to 1, the camera is in the extended state.

In some examples, the terminal may be a foldable device, including a first housing, a second housing, and a rotating shaft. The first housing and the second housing can rotate around the rotating shaft to unfold or fold the terminal. An intersection angle between the first housing and the second housing is the folding angle of the terminal, ranging from 0 to 180 degrees. When the terminal is in a completely unfolded state, the folding angle is 180 degrees. When the terminal is in a completely folded status, the folding angle is 0. In addition, the terminal further includes a display screen. The display screen is arranged on the same side on the first housing and the second housing and can be deformed as the first housing and the second housing rotate. The shielding situation of the radio frequency device varies depending on the folding angle of the terminal, i.e., depending on the relative position between the first housing and the second housing. Therefore, the first type of status information may include at least one of the folding angle of the terminal or the change in the folding angle of the terminal.

The change in the folding angle of the terminal refers to a difference between a currently detected folding angle and a previously detected folding angle during a folding process or an unfolding process of the terminal. The change in the folding angle ranges from 0 to 180 degrees. For detecting the change in the folding angle of the terminal, the folding angle of the terminal may be detected every preset time period to calculate the difference between the currently detected folding angle and the previously detected folding angle as the change in the folding angle. In another example, the change in the folding angle of the terminal may be obtained by calculating a difference between a current folding angle and a folding angle of an initial state after the terminal is in another state switched from the initial state for a preset time period.

2. The second type of status information is used to indicate a working status of the terminal or a change in a working status of the terminal.

The working condition of the radio frequency device will vary depending on the working status of the terminal, thereby affecting the performance of the radio frequency device and further affecting the signal transmission quality of the beam. Therefore, the second type of status information of the terminal can be obtained, such that the beam scanning range can be determined based on the working status or the change in the working status of the terminal.

In a possible implementation, the second type of status information includes at least one of global status data of the terminal, a change in global status data of the terminal, status data of at least one device in the terminal, or a change in status data of at least one device in the terminal.

The status of the terminal includes a global status and a status of at least one device in the terminal.

The global status data is used to describe the status of the terminal from a global perspective, which may include a switch status of the terminal, or an overall temperature of the terminal. The change in the global status data is used to describe the change in the status the terminal from a global perspective, which may include a change in the switch status of the terminal, or a change in the temperature of the terminal.

The status data of at least one device in the terminal is used to describe the status of corresponding devices. The status data of each device may include such as the temperature of the device, the operating voltage of the circuit, and the operating current of the circuit.

The change in the status data of at least one device in the terminal is used to describe a change condition of the status of the corresponding device. The change in the status data of each device may include the change in the temperature of the device, the change in the operating voltage of the circuit, the change in the operating current of the circuit.

3. The third type of status information is used to indicate a posture of the terminal or a change in a posture of the terminal.

The shielding condition of the radio frequency device varies depending on the posture of the terminal, thereby affecting the performance of the radio frequency device and further affecting the signal transmission quality of the beam. Therefore, the third type of status information of the terminal can be acquired, such that the beam scanning range can be determined based on the posture of the terminal or the change in the posture of the terminal.

In a possible implementation, the third type of status information includes at least one of posture information of the terminal or a change in posture information of the terminal.

The posture information of the terminal indicates a current posture of the terminal. For example, a surface where a display screen is located is taken as a front surface, a left-side surface or a right-side surface perpendicular to the display screen is located are taken as a side surface, a top side surface perpendicular to the display screen is taken as a top surface, and a bottom side surface perpendicular to the display screen is taken as a bottom surface. With the above definitions, the posture of the terminal can include such as the front surface facing up, the front surface facing down, the side surface facing down, or the bottom surface facing down. The change in the posture information of the terminal is used to indicate a change condition of the posture information of the terminal, including a rotation angle and a rotation direction of the terminal.

In another possible implementation, the terminal may be a foldable device. In this case, the third type of status information may also include a folding identifier of the terminal. The folding identifier is used to indicate whether the terminal is folded or not, such that folding identifier may equal to 0 or 1. When the foldable device is in a folded state, the folding identifier equals to 1. When the foldable device is in an unfolded state, the folding identifier equals to 0.

For example, a case where the side surface of the terminal faces down and the terminal is in the folded state means that the terminal is in a foldedly and laterally laid state. A case where the bottom surface of the terminal faces down and the terminal is in the folded state means that the terminal is in a foldedly and vertically laid state.

By acquiring the above status information, the status data of the terminal in at least one dimension can be obtained, such that the status of the terminal can be accurately described on at least one dimension. In addition, the beam scanning range can be determined by using the status data of the terminal in the at least one dimension.

In step 302, the terminal obtains a preset rule.

Different dimensions have different degrees of influence on the beam scanning range. That is, different beam scanning ranges match the status data in different dimensions. To determine an appropriate beam scanning range, the terminal may obtain the preset rule. The preset rule includes a respective influence rule of each dimension on the beam scanning range. A respective influence way of each dimension on the beam scanning range may be determined based on the preset rule.

In a possible implementation, the preset rule includes a first correspondence between status data of a first target dimension included in the at least one dimension and beam scanning ranges. The first correspondence indicates that a piece of status data corresponds to a beam scanning range on the first target dimension. The beam scanning range may change as the status data in the first target dimension changes.

In another possible implementation, the preset rule includes a second correspondence between status data of a second target dimension included in the at least one dimension and adjustment manners of the beam scanning range. The second correspondence indicates that a piece of status data corresponds to an adjustment manner of the beam scanning range on the second target dimension. The beam scanning range may be adjusted based on a corresponding adjustment manner as the status data of the second target dimension changes.

The first target dimension and the second target dimension may be any two of the above at least one dimension. The first target dimension may be different from the second target dimension.

In another possible implementation, the preset rule includes a respective weight of each of the at least one dimension. The weight is used to indicate a degree of influence of the status data of a corresponding dimension on the beam scanning range. The greater the weight, the greater the influence on the bean scanning range when the status data of the corresponding dimension changes.

It is to be noted that different types of terminals have different effects on the radio frequency device and the signal quality of beams. Therefore, a corresponding preset rule can be set based on the type of the terminal. Same or different preset rules may be set for different types of terminals.

In step 303, the terminal determines the beam scanning range based on the status data of the at least one dimension and the preset rule.

The beam scanning range includes multiple beam identifiers to be scanned. Each beam identifier is used to indicate a unique and corresponding beam, and the beam identifier may be a beam series number. Determining the beam scanning range means that the terminal only needs to scan the beams corresponding to the multiple beam identifiers within the beam scanning range, without the need of scanning other beams.

In a possible implementation, the preset rule includes the above-mentioned first correspondence. In this case, the beam scanning range corresponding to the status data of the first target dimension is determined based on the status data of the first target dimension and the first correspondence.

For example, the first target dimension refers to whether the camera is in an extended state or in a retracted state, and the status data of the first target dimension is thus the extended identifier. In a case where the extended identifier equals to 1, the camera is in the extended state and the determined beam scanning range is from the beam identifier 1 to the beam identifier 8. In a case where the extended identifier equals to 0, the camera is in the retracted state and the determined beam scanning range is from the beam identifier 1 to the beam identifier 16.

As another example, the first target dimension refers to the folding angle of the terminal, and thus the status data of the first target dimension is the folding angle of the terminal. In a case that the folding angle of the terminal is 10 degrees, the determined beam scanning range is from the beam identifier 1 to the beam identifier 8. In a case that the folding angle of the terminal is 30 degrees, the determined beam scanning range is from the beam identifier 1 to the beam identifier 16.

In another possible implementation, the preset rule includes the above-mentioned second correspondence, and the adjustment manner of the beam scanning range corresponding to the status data of the second target dimension is determined based on the status data of the second target dimension and the second correspondence. The original beam scanning range is adjusted based on the adjustment manner to obtain the adjusted beam scanning range.

In an example, the original beam scanning range may be determined by the terminal based on all beams within the spatial area where the terminal is located. In another example, the original beam scanning range may be determined by the base station based on all beams within the spatial area where the terminal is located. In still another example, the original beam scanning range may be determined by the terminal based on the status data of the first target dimension and the first correspondence.

The adjustment manner may help to reduce the number of beams within the original beam scanning range. As an example, a largest beam identifier or a certain number of relatively large beam identifiers within the original beam scanning range may be removed. As another example, a smallest beam identifier or a certain number of relatively small beam identifiers within the original beam scanning range may be removed.

For example, the second target dimension refers to a change condition of the folding angle of the terminal, and thus the status data of the second target dimension is the change in the folding angle of the terminal. In a case where the terminal is in the unfolded state, the original beam scanning range is determined, and one beam is removed from the original beam scanning range per 10 degrees by which the folding angle of the terminal changes to obtain the adjusted beam scanning range. The beam to be removed from the original beam scanning range is determined by whether the folding angle of the terminal increases or decreases.

As another example, the second target dimension includes the posture of the terminal and the change in the folding angle, and thus the status data of the second target dimension is the posture information of the terminal and the change in the folding angle of the terminal. In an example, while unfolding the terminal from the foldedly and vertically laid state, one beam is removed from the original beam scanning range per 10 degrees by which the folding angle of the terminal changes, to obtain the adjusted beam scanning range. In another example, while unfolding the terminal from the foldedly and laterally laid state, one beam is removed from the original beam scanning range per 20 degrees by which the folding angle of the terminal changes, to obtain the adjusted beam scanning range.

In another possible implementation, the preset rule includes the first correspondence and the second correspondence. A first beam scanning range corresponding to the status data of the first target dimension is determined based on the status data of the first target dimension and the first correspondence, and an adjustment manner of the beam scanning range corresponding to the status data of the second target dimension is determined based on the status data of the second target dimension and the second correspondence. The first beam scanning range is adjusted based on the adjustment manner to obtain the adjusted beam scanning range.

For example, the first target dimension refers to the folding angle of the terminal, and the second target dimension refers to the change in the folding angle of the terminal. Therefore, the status data of the first target dimension is the folding angle of the terminal, and the status data of the second target dimension is the change of the folding angle of the terminal. In a case where the folding angle of the terminal is 100 degrees, the determined first beam scanning range is from the beam identifier 1 to the beam identifier 20. In a case where the folding angle of the terminal is reduced by 10 degrees, the beam identifier 20 is removed from the first beam scanning range, and the adjusted beam scanning range is from the beam identifier 1 to the beam identifier 19.

In another possible implementation, the preset rule includes weights of multiple dimensions and a third correspondence between index identifiers and beam scanning ranges. A weighted summation is performed based on the status data of multiple dimensions of the at least one dimension and the weights of the multiple dimensions, to obtain an index identifier. The beam scanning range corresponding to the index identifier is determined based on the index identifier obtained through the weighted summation and the third correspondence.

For example, when the at least one dimension includes the rotation angle of the camera and the folding angle of the terminal, the rotation angle and the folding angle are weighted and summed up with the following formula to obtain the index identifier:

$$Z = aX + bY,$$

where, a is the weight of the rotation angle of the camera, X is the rotation angle of the camera, b is the weight of the folding angle of the terminal, B is the folding angle of the terminal, and Z is the index identifier.

By performing the weighted summation, the status data of multiple dimensions can be comprehensively calculated, and the influence of each dimension can be comprehensively considered to determine an accurate beam scanning range.

It is to be noted that the status data of some dimensions will affect the performance of the radio frequency device when the status data meets some conditions, and will not affect the performance of the radio frequency device when the status data does not meet these conditions. Therefore, for a dimension, the beam scanning range may be determined based on the status data of the dimension with the above-mention methods when a preset condition corresponding to the dimension is met, and the status data of this dimension is no considered any more when the preset condition corresponding to the dimension is not met.

For example, when the front surface of the terminal faces down, the beam scanning range is not affected by whether the camera is in the extended state or the retracted state. When the front surface of the terminal faces up, whether the camera is in the extended state or the retracted state will affect the beam scanning range. Therefore, when the posture of the terminal is that the front surface faces down, the extended identifier of the camera is not considered, and when the posture of the terminal is that the front surface faces up, the corresponding beam scanning range is determined based on the extended identifier of the camera.

In step 304, the terminal performs beam scanning based on multiple beam identifiers within the beam scanning range.

The terminal scans and measures each beam corresponding to a respective beam identifier based on the multiple beam identifiers within the beam scanning range, to obtain the signal quality of each beam. The terminal determines a beam to be used to transmit signals based on the signal quality of each beam and transmits a signal to the base station through the determined beam.

In the disclosure, based on the status information of the terminal, beams that are greatly affected by the status of the terminal may be disqualified to narrow the beam scanning range, thereby saving scanning time, improving scanning efficiency, and reducing signal transmission delay.

In a possible implementation, in performing the beam scanning, limited by the scanning duration, the terminal can only scan a limited number of beams. Therefore, in performing the beam scanning based on the beam scanning range, the terminal may determine a scanning step length based on the number of the beam identifiers within the beam scanning range, determine the beam identifiers to be scanned within the bean scanning range based on the scanning step length, and perform the beam scanning based on the beam identifiers to be scanned.

For example, the number of beam identifiers within the beam scanning range is 8, and the determined scanning step length is 2. In this case, the beam identifiers 1, 3, 4, and 7 are determined as the beam identifiers to be scanned and then the beams corresponding to the beam identifiers 1, 3, 5, and 7 are scanned in performing the beam scanning.

It is to be noted that the disclosure is only described by taking the terminal as the execution subject as an example. In another possible implementation, the beam scanning range may be determined by the base station. The terminal transmits the status information and the preset rule to the base station, and the base station receives the status information and the preset rule transmitted by the terminal, determines the beam scanning range based on the status information of the terminal and the preset rule, and transmits the beam scanning range to the terminal. The terminal receives the beam scanning range, and performs the beam scanning based on multiple beam identifiers within the beam scanning range, or the terminal determines the scanning step length based on the number of the beam identifiers within the beam scanning length, determines the beam identifiers to be scanned within the beam scanning range based on the scanning step length, and performs the beam scanning based on the beam identifiers to be scanned.

The terminal may send the status information and the preset rule to the base station through a physical layer signaling or an upper layer signaling.

With the method according to the disclosure, the status information of the terminal and the preset rule are acquired. The status information includes the status data of at least one dimension, and at least one dimension is preset that affects the performance of the radio frequency device in the terminal. The preset rule includes the influence rules of respective dimensions on the beam scanning range. The beam scanning range can be determined based on the status data of the at least one dimension and the preset rule. Therefore, a beam that is greatly affected by the status of the terminal may be disqualified to narrow the beam scanning range, thereby saving scanning time, improving scanning efficiency, and reducing signal transmission delay.

Figure 4:
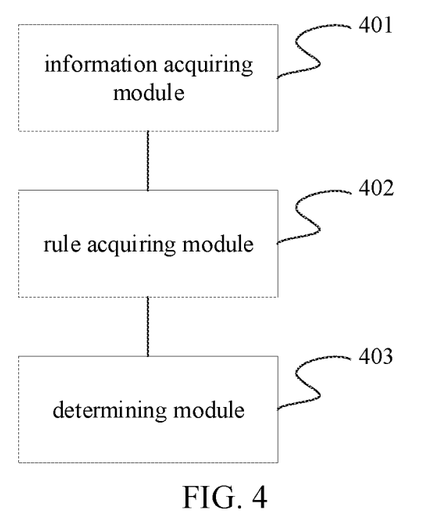
FIG. 4 is a block diagram illustrating a device for determining a beam scanning range according to some embodiments of the disclosure.

FIG. 4 is a block diagram illustrating a device for determining a beam scanning range according to some embodiments of the disclosure. As illustrated in FIG. 4, the device includes an information acquiring module 401, a rule acquiring module 402, and a determining module 403.

The information acquiring module is configured to acquire status information of the terminal. The status information includes status data of at least one dimension. The at least one dimension is preset one or more dimensions that affect performance of a radio frequency device in the terminal.

The rule acquiring module is configured to acquire a preset rule. The preset rule includes a respective influence rule of each of the at least one dimension on the beam scanning range.

The determining module is configured to determine a beam scanning range based on the status data of the at least one dimension and the preset rule.

In a possible implementation, the status information includes at least one of a first type of status information, a second type of status information, or a third type of status information.

The first type of status information is used to indicate a relative positional relationship between the radio frequency device and other devices in the terminal than the radio frequency device, or a change in a relative position relationship between the radio frequency device and other devices in the terminal than the radio frequency device.

The second type of status information is used to indicate a working status of the terminal or a change in a working status of the terminal.

The third type of status information is used to indicate a posture of the terminal or a change in a posture of the terminal.

In another possible implementation, the first type of status information includes at least one of an extended identifier of a camera, a folding angle of the terminal, or a change in a folding angle of the terminal. The extended identifier is used for indicate whether the camera is in an extended state or in a retracted state.

The second type of status information includes at least one of global status data of the terminal, a change in global status data of the terminal, status data of at least one device in the terminal, or a change in status data of at least one device in the terminal.

The third type of status information includes at least one of posture information of the terminal, a change in posture information of the terminal, or a folding identifier of the terminal. The folding identifier is used to indicate whether the terminal is folded or unfolded.

In another possible implementation, the preset rule includes a first correspondence between status data of a first target dimension included in the at least one dimension and beam scanning ranges.

The determining module 403 includes a range determining unit.

The range determining unit is configured to determine the beam scanning range corresponding to the status data of the first target dimension based on the status data of the first target dimension and the first correspondence.

In another possible implementation, the preset rule includes a second correspondence between status data of a second target dimension included in the at least one dimension and adjustment manners of the beam scanning range.

The determining module 403 includes an adjustment manner determining unit and an adjusting unit.

The adjustment manner determining unit is configured to determine an adjustment manner of the beam scanning range corresponding to the status data of the second target dimension based on the status data of the second target dimension and the second correspondence.

The adjustment unit is configured to adjust an original beam scanning range based on the adjustment manner to obtain the adjusted beam scanning range.

In another possible implementation, the preset rule includes a first correspondence between status data of a first target dimension included in the at least one dimension and beam scanning ranges, and a second correspondence between status data of a second target dimension included in the at least one dimension and adjustment manners of the beam scanning range;

The determining module 403 includes a range determining unit, an adjustment manner determining unit, and an adjusting unit.

The range determining unit is configured to determine a first beam scanning range corresponding to the status data of the first target dimension based on the status data of the first target dimension and the first correspondence.

The adjustment mode determining unit is configured to determine an adjustment manner of the beam scanning range corresponding to the status data of the second target dimension based on the status data of the second target dimension and the second correspondence.

The adjustment unit is configured to adjust the first beam scanning range based on the adjustment manner to obtain the adjusted beam scanning range.

In another possible implementation, the preset rule includes weights of multiple dimensions and a third correspondence between index identifiers and beam scanning ranges.

The determining module 403 includes a statistic unit, and a determining unit.

The statistic unit is configured to perform a weighted summation based on status data of the multiple dimensions of the at least one dimension and the weights of the multiple dimensions to obtain an index identifier.

The determining unit is configured to determine the beam scanning range corresponding to the index identifier obtained by the weighted summation based on the third correspondence.

In another possible implementation, the device further includes a scanning module.

The scanning module is configured to perform beam scanning based on multiple beam identifiers within the beam scanning range, or the scanning module is configured to determine a scanning step length based on the number of the beam identifiers within the beam scanning length, determine beam identifiers to be scanned from the beam scanning range based on the scanning step length, and perform the beam scanning based on the beam identifiers to be scanned.

In another possible implementation, the device further includes a transmitting module.

The transmitting module is configured to transmit the beam scanning range to the terminal.

The terminal is configured to perform the beam scanning based on multiple beam identifiers within the beam scanning range, or determine a scanning step length based on the number of the beam identifiers within the beam scanning range, determine beam identifiers to be scanned within the beam scanning range based on the scanning step length, and perform the beam scanning based on the beam identifiers to be scanned.

With the device for determining a beam scanning range according to embodiments of the disclosure, the status information of the terminal and the preset rule are acquired. The status information includes the status data of the at least one dimension, and at least one dimension is preset one or more dimensions that affect the performance of the radio frequency device in the terminal. The preset rule includes the influence rule of each of the at least one dimension on the beam scanning range. The beam scanning range can be determined based on the status data of the at least one dimension and the preset rule. A beam that is greatly affected by the status of the terminal may be removed to narrow the beam scanning range, thereby saving scanning time, improving scanning efficiency, and reducing signal transmission delay.

It is to be noted that the division of the device for determining a beam scanning range according to the foregoing embodiments into the above-mentioned functional modules is only an example for illustration when determining the beam scanning range. In practice, the above-mentioned functions can be allocated to different functional modules according to needs. That is, the internal structure of the base station or the terminal may be divided into different functional modules to realize all or part of the above-described functions. In addition, the device for determining a beam scanning range according to the foregoing embodiments and the device for determining a beam scanning range according to the method embodiments are linked to the same concept, and the specific implementation process of the device may be referred to the method embodiments, which are not repeated here.

Figure 5:
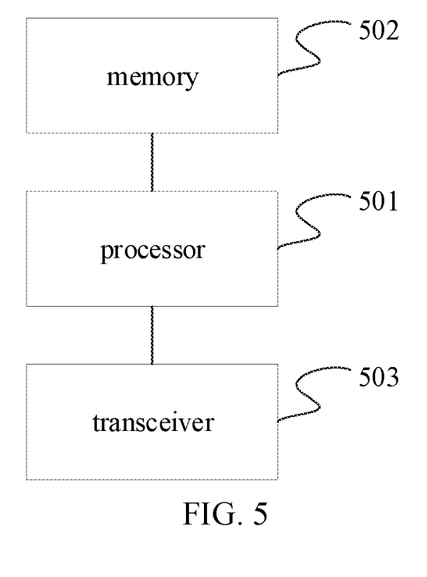
FIG. 5 is a block diagram illustrating a base station according to some embodiments of the disclosure.

FIG. 5 is a block diagram illustrating a base station according to some embodiments of the disclosure. As illustrated in FIG. 5, the base station includes a processor 501, a memory 502 configured to store instructions executable by the processor, and a transceiver 503. The processor 501 is configured to acquire status information of the terminal, in which the status information includes status data of at least one dimension and the at least one dimension is preset one or more dimensions that affect performance of a radio frequency device in the terminal, acquire a preset rule, in which the preset rule includes a respective influence rule of each of the at least one dimension on the beam scanning range, and determine a beam scanning range based on status data of at least one dimension and the preset rule.

The disclosure further provides a computer-readable storage medium. When instructions stored in the computer-readable storage medium are executed by a processor of the base station, the base station is configured to execute a method for determining a beam scanning range according to the foregoing embodiments.

Figure 6:
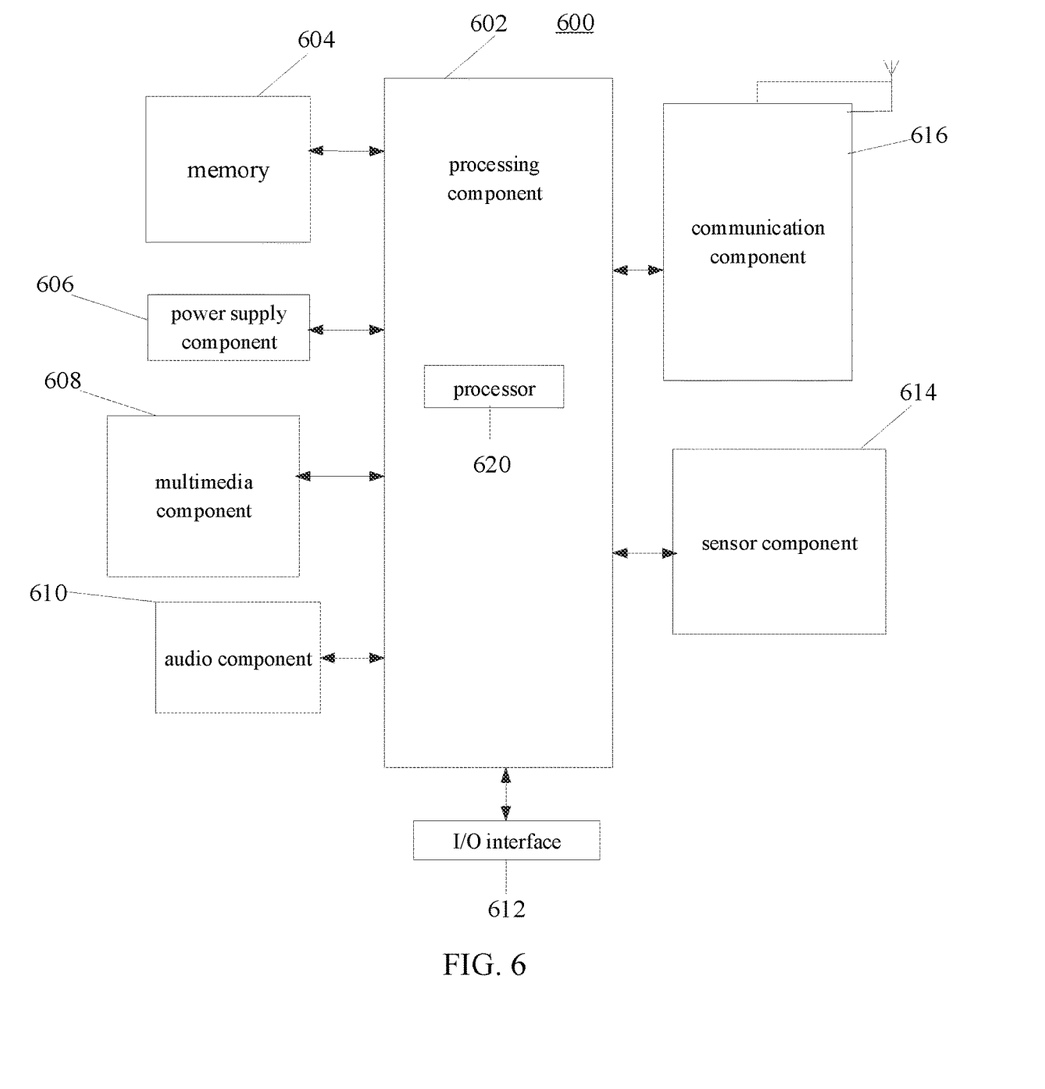
FIG. 6 is a block diagram illustrating a terminal according to some embodiments of the disclosure.

FIG. 6 is a block diagram illustrating a terminal according to some embodiments of the disclosure. For example, the terminal 600 may be a mobile phone, a computer, a digital broadcasting device, a messaging device, a game console, a tablet device, a medical device, a fitness device, a personal digital assistant, etc.

As illustrated in FIG. 6, the terminal 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally controls the overall operations of the terminal 600, such as operations associated with display, telephone calls, data communications, camera operations, and recording operations. The processing component 602 may include one or more processors 620 to execute instructions to complete all or part of the steps of the foregoing method. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support operations in the terminal 600. Examples of these data include instructions for any application or method operated on the terminal 600, contact data, phone book data, messages, pictures, videos, etc. The memory 604 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power supply component 606 provides power for various components of the terminal 600. The power supply component 606 may include a power management system, one or more power supplies, and other components associated with the generation, management, and distribution of power for the terminal 600.

The multimedia component 608 includes a screen that provides an output interface between the terminal 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or sliding action, but also detect the duration and pressure related to the touch or sliding operation. In some embodiments, the multimedia component 608 includes a front camera and/or a rear camera. When the terminal 600 is in an operation mode, such as a shooting mode or a video mode, the front camera and/or the rear camera can receive external multimedia data. Each front camera and rear camera can be a fixed optical lens system or have focal length and optical zoom capabilities.

The audio component 610 is configured to output and/or input audio signals. For example, the audio component 610 includes a microphone (MIC). When the terminal 600 is in an operation mode, such as a call mode, a recording mode, and a voice recognition mode, the microphone is configured to receive external audio signals. The received audio signal can be further stored in the memory 604 or sent via the communication component 616. In some embodiments, the audio component 610 further includes a speaker for outputting audio signals.

The I/O interface 612 provides an interface between the processing component 602 and a peripheral interface module. The above-mentioned peripheral interface module may be a keyboard, a click wheel, a button, and the like. These buttons may include, but are not limited to, home button, volume button, start button, and lock button.

The sensor component 614 includes one or more sensors for providing the terminal 600 with various status assessments. For example, the sensor component 614 can detect the open/close status of the terminal 600 and the relative positioning of components. For example, the component is the display and the keypad of the terminal 600. The sensor component 614 can also detect the position change of the terminal 600 or a component of the terminal 600, the presence or absence of contact between the user and the terminal 600, the orientation or acceleration/deceleration of the terminal 600, and the temperature change of the terminal 600. The sensor component 614 may include a proximity sensor configured to detect the presence of nearby objects when there is no physical contact. The sensor component 614 may also include a light sensor, such as a CMOS or CCD image sensor, for use in imaging applications. In some embodiments, the sensor component 614 may also include an acceleration sensor, a gyroscope sensor, a magnetic sensor, a pressure sensor, or a temperature sensor.

The communication component 616 is configured to facilitate wired or wireless communication between the terminal 600 and other devices. The terminal 600 can access a wireless network based on a communication standard, such as Wi-Fi, 2G, or 3G, or a combination thereof. In an exemplary embodiment, the communication component 616 receives a broadcast signal or broadcast related information from an external broadcast management system via a broadcast channel. In an exemplary embodiment, the communication component 616 further includes a near field communication (NFC) module to facilitate short-communication.

In an exemplary embodiment, the terminal 600 may be implemented by one or more application specific integrated circuits (ASIC), digital signal processors (DSP), digital signal processing devices (DSPD), programmable logic devices (PLD), field programmable I gate array (FPGA), controller, microcontroller, microprocessor, or other electronic components, used to implement the above method for determining a beam scanning range.

In some embodiments, there is also provided a non-transitory computer-readable storage medium having instructions stored thereon, such as the memory 604 including instructions. The instructions may cause the processor 620 of the terminal 600 to execute the foregoing method. For example, the non-transitory computer-readable storage medium may be ROM, random access memory (RAM), CD-ROM, magnetic tape, floppy disk, optical data storage device, etc.

There is also provided a computer-readable storage medium. When instructions in the computer-readable storage medium are executed by a processor of the terminal, the terminal is caused to execute the method of the above-mentioned embodiments.

The method includes acquiring status information of the terminal. The status information includes status data of at least one dimension and the at least one dimension is a preset one or more dimensions that affect performance of a radio frequency device in the terminal. The method further includes: acquiring a preset rule. The preset rule includes a respective influence rule of each of the at least one dimension on the beam scanning range. The method further includes determining the beam scanning range based on the status data of the at least one dimension and the preset rule.

With the above solution, all the beams corresponding to the beam identifiers within the beam scanning range need to be scanned, which spends too long time and results in low beam scanning efficiency and delays in signal transmission.

Those of ordinary skill in the art can understand that all or part of the steps in the above-mentioned embodiments can be implemented by hardware, or by a program to instruct related hardware, and the program can be stored in a machine-readable storage medium. The aforementioned storage medium may be a read-only memory, a magnetic disk or an optical disk, etc.

The above are only some optional embodiments of the embodiments of the disclosure, and are not intended to limit the disclosure. Any modification, equivalent replacement, improvement made within the spirit and principle of the embodiments of the disclosure shall be included in the protection scope of embodiments of the disclosure.

What is claimed is:

1. A method for determining a beam scanning range, comprising:
   acquiring status information of a terminal, the status information comprising status data of at least one dimension, the at least one dimension being preset to affect performance of a radio frequency device in the terminal;
   acquiring a preset rule, the preset rule comprising a respective influence rule of each dimension on the beam scanning range; and
   determining the beam scanning range based on the status data of the at least one dimension and the preset rule;
   wherein the preset rule comprises weights of multiple dimensions and a third correspondence between index identifiers and beam scanning ranges, and
   determining the beam scanning range based on the status data of the at least one dimension and the preset rule comprises:
      obtaining an index identifier by performing a weighted summation based on the status data of the multiple dimensions included in the at least one dimension and the weights of the multiple dimensions; and
      determining the beam scanning range corresponding to the index identifier obtained through the weighted summation based on the third correspondence.

2. The method of claim 1, wherein the status information comprises at least one of a first type of status information, a second type of status information, or a third type of status information; wherein
   the first type of status information indicates a relative position relationship, or a change in a relative position relationship, between the radio frequency device of the terminal and an additional device of the terminal;
   the second type of status information indicates a wording status of the terminal or a change in a wording status of the terminal; and
   the third type of status information indicates a posture of the terminal or a change in a posture of the terminal.

3. The method of claim 2, wherein
   the first type of status information comprises at least one of an extended identifier of a camera comprised in the terminal, a folding angle of the terminal, or a change in a folding angle of the terminal, the extended identifier indicates whether the camera is in an extended state or in a retracted state;
   the second type of status information comprises at least one of global status data of the terminal, a change in global status data of the terminal, status data of at least one device of the terminal, or a change in status data of at least one device of the terminal; and
   the third type of status information comprises at least one of posture information of the terminal, a change in posture information of the terminal, or a folding identifier of the terminal, the folding identifier indicating whether the terminal is folded or unfolded.

4. The method of claim 1, wherein the preset rule comprises a first correspondence between status information of a first target dimension included in the at least one dimension and beam scanning ranges; and
   determining the beam scanning range based on the status data of the at least one dimension and the preset rule comprises:
      determining the beam scanning range corresponding to the status data of the first target dimension based on the status data of the first target dimension and the first correspondence.

5. The method of claim 1, wherein the preset rule comprises a second correspondence between status data of a second target dimension included in the at least one dimension and adjustment manners of beam scanning ranges; and
   determining the beam scanning range based on the status data of the at least one dimension and the preset rule comprises:
      determining an adjustment manner corresponding to the status data of the second target dimension based on the status data of the second target dimension and the second correspondence; and
      adjusting an initial beam scanning range based on the adjustment manner to obtain an adjusted beam scanning range.

6. The method of claim 1, wherein the preset rule comprises a first correspondence between status data of a first target dimension included in the at least one dimension and beam scanning ranges, and a second correspondence between status data of a second target dimension included in the at least one dimension and adjustment manners of beam scanning ranges; and
   determining the beam scanning range based on the status data of the at least one dimension and the preset rule comprises:
      determining a first beam scanning range corresponding to the status data of the first target dimension based on the status data of the first target dimension and the first correspondence;
      determining an adjustment manner of the beam scanning range corresponding to the status data of the second target dimension based on the status data of the second target dimension and the second correspondence; and
      adjusting the first beam scanning range based on the adjustment manner to obtain an adjusted beam scanning range.

7. The method of claim 1, further comprising at least of one of the following actions:
   performing beam scanning based on multiple beam identifiers within the beam scanning range; and determining a scanning step length based on the number of the beam identifiers within the beam scanning range, determining beam identifiers to be scanned within the beam scanning range based on the scanning step length, and performing the beam scanning based on the beam identifiers to be scanned.

8. A terminal, comprising:
a processor; and
a memory, configured to store instructions executable by the processor;
wherein the processor is configured to:
acquire status information of the terminal, the status information comprising status data of at least one dimension, the at least one dimension being preset to affect performance of a radio frequency device in the terminal;
acquire a preset rule, the preset rule comprising a respective influence rule of each dimension on a beam scanning range; and
determine the beam scanning range based on the status data of the at least one dimension and the preset rule;
wherein the preset rule comprises weights of multiple dimensions and a third correspondence between index identifiers and beam scanning ranges, and
the processor is further configured to obtain an index identifier by performing a weighted summation based on the status data of the multiple dimensions included in the at least one dimension and the weights of the multiple dimensions; and determine the beam scanning range corresponding to the index identifier obtained through the weighted summation based on the third correspondence.

9. The terminal of claim 8, wherein the status information comprises at least one of a first type of status information, a second type of status information, or a third type of status information, wherein
the first type of status information indicates a relative position relationship, or a change in a relative position relationship, between the radio frequency device of the terminal and an addition device of the terminal;
the second type of status information indicates a wording status of the terminal or a change in a wording status of the terminal; and
the third type of status information indicates a posture of the terminal or a change in a posture of the terminal.

10. The terminal of claim 9, wherein,
the first type of status information comprises at least one of an extended identifier of a camera comprised within the terminal, a folding angle of the terminal, or a change in a folding angle of the terminal, the extended identifier indicates whether the camera is in an extended state or in a retracted state;
the second type of status information comprises at least one of global status data of the terminal, a change in global status data of the terminal, status data of at least one device of the terminal, or a change in status data of at least one device of the terminal; or
the third type of status information comprises at least one of posture information of the terminal, a change in posture information of the terminal, or a folding identifier of the terminal, the folding identifier indicating whether the terminal is folded or unfolded.

11. The terminal of claim 8, wherein the preset rule comprises a first correspondence between status information of a first target dimension included in the at least one dimension and beam scanning ranges; and the processor is further configured to determine the beam scanning range corresponding to the status data of the first target dimension based on the status data of the first target dimension and the first correspondence.

12. The terminal of claim 8, wherein the preset rule comprises a second correspondence between status data of a second target dimension included in the at least one dimension and adjustment manners of beam scanning ranges; and
the processor is further configured to determine an adjustment manner corresponding to the status data of the second target dimension based on the status data of the second target dimension and the second correspondence; and adjust an initial beam scanning range based on the adjustment manner to obtain an adjusted beam scanning range.

13. The terminal of claim 8, wherein the preset rule comprises a first correspondence between status data of a first target dimension included in the at least one dimension and beam scanning ranges, and a second correspondence between status data of a second target dimension included in the at least one dimension and adjustment manners of beam scanning ranges; and
the processor is further configured to determine a first beam scanning range corresponding to the status data of the first target dimension based on the status data of the first target dimension and the first correspondence; determine an adjustment manner of the beam scanning range corresponding to the status data of the second target dimension based on the status data of the second target dimension and the second correspondence; and adjust the first beam scanning range based on the adjustment manner to obtain an adjusted beam scanning range.

14. The terminal of claim 8, wherein the processor is further configured to:
perform beam scanning based on multiple beam identifiers within the beam scanning range; or
determine a scanning step length based on the number of the beam identifiers within the beam scanning range, determine beam identifiers to be scanned within the beam scanning range based on the scanning step length, and perform the beam scanning based on the beam identifiers to be scanned.

15. A non-transitory computer readable storage medium, having at least one instruction stored thereon, wherein the at least one instruction is loaded by a processor to cause the processor to execute a method for determining a beam scanning range, the method comprising:
acquiring status information of a terminal, the status information comprising status data of at least one dimension, the at least one dimension being preset to affect performance of a radio frequency device in the terminal;
acquiring a preset rule, the preset rule comprising a respective influence rule of each dimension on the beam scanning range; and
determining the beam scanning range based on the status data of the at least one dimension and the preset rule;
wherein the preset rule comprises weights of multiple dimensions and a third correspondence between index identifiers and beam scanning ranges, and
determining the beam scanning range based on the status data of the at least one dimension and the preset rule comprises:
obtaining an index identifier by performing a weighted summation based on the status data of the multiple dimensions included in the at least one dimension and the weights of the multiple dimensions; and determining the beam scanning range corresponding to the index identifier obtained through the weighted summation based on the third correspondence.

16. The non-transitory computer readable storage medium of claim 15, wherein the status information comprises at least one of a first type of status information, a second type of status information, or a third type of status information, wherein the first type of status information indicates a relative position relationship, or a change in a relative position relationship, between the radio frequency device of the terminal and an additional device of the terminal;

the second type of status information indicates a wording status of the terminal or a change in a wording status of the terminal; and the third type of status information indicates a posture of the terminal or a change in a posture of the terminal.

* * * * *